Figure 1:
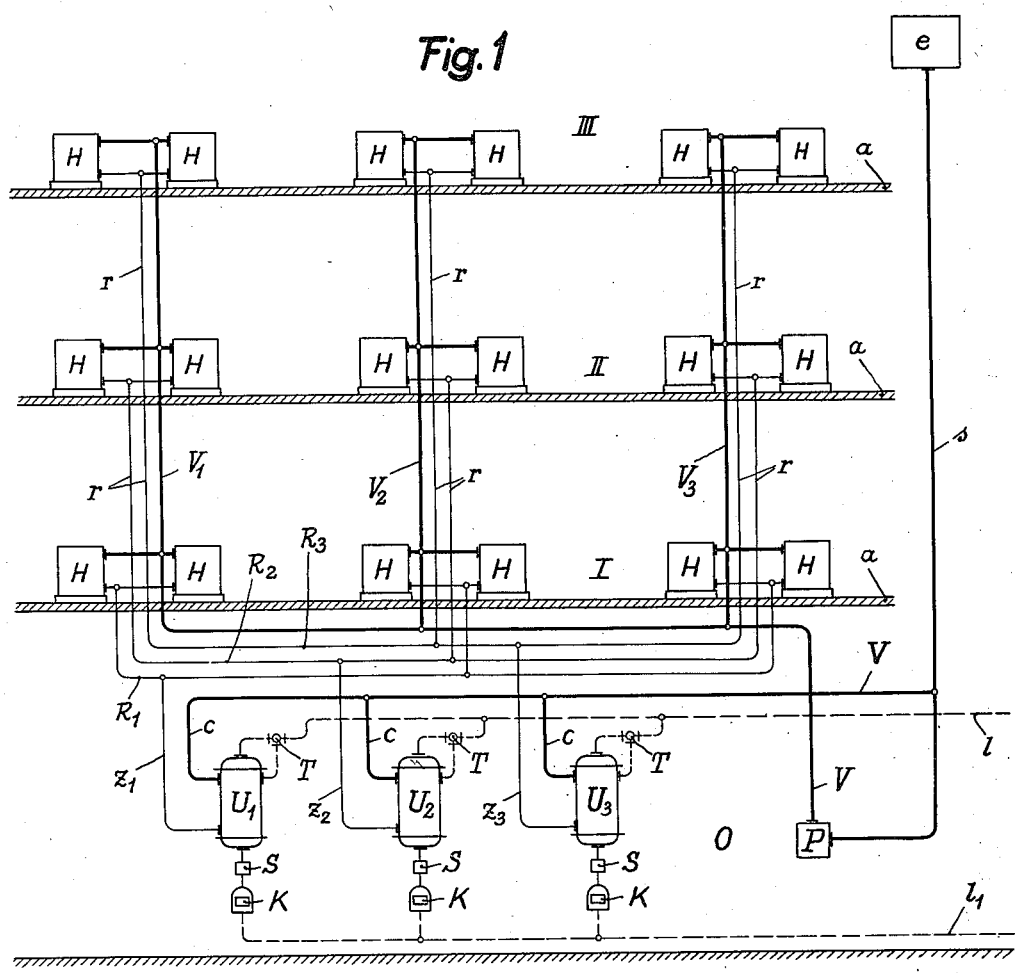

May 14, 1935.  H. VIEWEGH  2,001,226
HOT WATER CENTRAL HEATING SYSTEM FOR A PLURALITY OF CONSUMER
UNITS WITH INDIRECT MEASUREMENT OF THE HEAT CONSUMED
Filed Feb. 3, 1933

Patented May 14, 1935

2,001,226

UNITED STATES PATENT OFFICE 2,001,226

HOT WATER CENTRAL HEATING SYSTEM FOR A PLURALITY OF CONSUMER UNITS WITH INDIRECT MEASUREMENT OF THE HEAT CONSUMED

Heinrich Viewegh, Vienna, Austria

Application February 3, 1933, Serial No. 655,088
In Austria February 10, 1932

3 Claims. (Cl. 237—13)

Application has been filed in Austria February 10, 1932.

This invention relates to a hot water heating system for a plurality of consumers and equipped for indirect measurement of the respective quantities of heat consumed. Hot water heating systems have already become known in which the hot water is supplied from a heat-exchanger to each consumer separately through a separate supply pipe, and caused to flow back to the heat-exchanger from the radiators through a separate return pipe. For this purpose the heat-exchanger can be located in the cellar or on the individual floors. The heat-exchanger is connected to a low pressure steam supply line, the quantity of the condensate is measured by a water meter of the drum type, and the reading of this meter gives a basis on which the quantity of heat consumed and charged for can be calculated. This is the most accurate method of measurement. If, however, a plurality of consumers be connected to one hot water heating system, difficulties arise in the measuring and apportioning the costs of the quantity of heat supplied to each consumer. In hot water heating systems of this type, with a plurality of consumers, the water is heated in a heat-exchanger and supplied to the individual consumers through separate supply pipes, the cooled water returning to the heat-exchanger through separate flow pipes for each consumer. For the purpose of measuring the quantity of heat supplied to each individual consumer a meter for heat quantity is interposed in each supply pipe from the heat-exchanger. These meters generally take the form of vane water meters with measurement of the difference of temperature between supply and return. Their greatest drawback is that they are not sensitive enough to respond to slow through-flow, while at the same time they are structurally complicated and expensive.

Attempts in this direction have thus proved unsatisfactory. The inclusion of complicated and expensive instruments in central heating systems has in practice been abandoned, and recourse is now usually had to an approximate apportionment of the expenses of the entire heating plant to the individual consumers in lump sums. This arrangement, however, leads to the disadvantage that the consumers have no incentive to be economical in the use of heat, so that the actual cost of heating to the landlord tends to exceed the sum total of the apportioned amounts.

The present invention provides a hot water heating system for a plurality of consumers and equipped with indirect measurement of the respective quantities of heat actually supplied to each consumer separately in which the water is caused to circulate from a heat-exchanger to the consumer and back to the heat-exchanger, and in which the above-mentioned drawbacks of known or proposed systems are obviated. The invention is characterized by the employment of a supply-pipe system common to all the consumers and of separate return pipes for each of the consumers. It is thus possible for all the heat-exchangers to be connected to a common flow pipe, and for the return-flow water to be heated to a certain definite and constant temperature in the supply pipe system. The quantity of the condensate from the heating steam supplied to each heat-exchanger is a measure of the amount of heat supplied to each individual consumer. The quantity of the condensate is measured for each consumer individually, since the return flow is brought from each consumer separately to a separate heat-exchanger. As against the central heating systems with approximate apportionment of the heating costs to the consumers in lump sums the system according to the present invention has the advantage that each consumer is only charged for the actual amount of heat consumed. There is thus a real incentive to economy in the use of heat on the part of the consumers, which makes up for the somewhat increased initial cost of the plant conditioned by the employment of a somewhat more extensive system of piping than is otherwise necessary. As against central heating systems with expensive and complicated meters of heat quantity the system according to the present invention has the advantage that simple drum water meters are employed.

The new system will be more readily understood from the following detailed description taken in conjunction with the accompanying drawing, in which Fig. 1 shows diagrammatically the piping system for a multi-storied dwelling house in which the heat-exchangers and the condensate meters are arranged in the cellar or basement floor.

Figure 2:
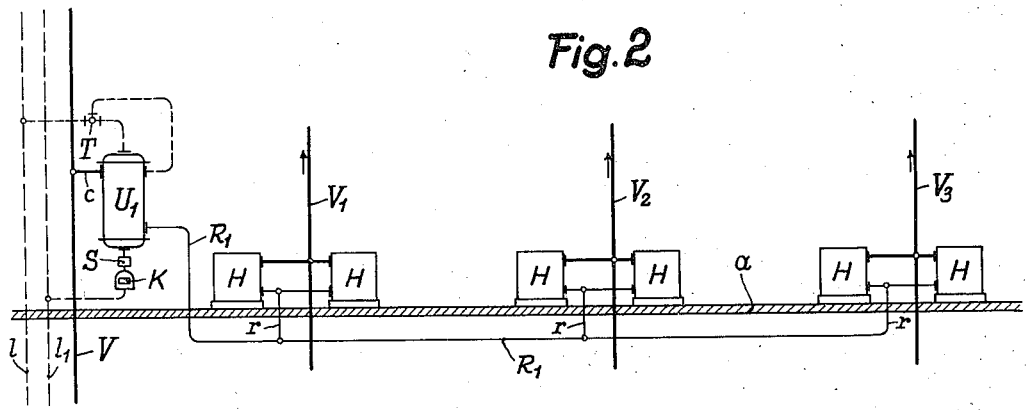

Fig. 2 shows the arrangement of the piping system when the heat-exchanger and condensate meter for one consumer unit is arranged on the same floor as this unit.

In each of these figures the stories in which the radiators H are provided are represented by diagrammatically indicated ceilings or floors $a$. The hot water, as heating medium, is supplied to the radiators H through a supply pipe line V common to all the groups, for example the stories I, II, and III, by means of a forced circulation pump P, this supply pipe line V being branched into a plurality of branch lines $V_1$, $V_2$, $V_3$. To the supply pipe there is further connected a pipe line $s$ leading to the expansion chamber $e$ located at the highest point in the entire piping system. According to the arrangement of the consumer units and to the local conditions a separate return-pipe system $r$ is taken from each story (or from each unit) separately, and run together in the basement to form separate collecting return pipes $R_1$, $R_2$, $R_3$ for each consumer unit. Each of these return pipes is connected through a branch pipe $z_1$, $z_2$, $z_3$ to a separate heat-exchanger $U_1$, $U_2$, $U_3$. In these heat-exchangers the return water is heated by means of steam, which is supplied through a steam pipe $l$ either directly from a boiler (not shown in the drawing) or from a long-distance supply system, to a predetermined supply temperature, which is retained constant by the regulator T, and then supplied through the branch pipes $c$ and the forced-circulation pump to the supply pipe V common to all the consumer units.

The measurement of the respective quantities of heat supplied to the individual consumers is carried out by measurement of the steam condensate in the meters K, on the strength of the fact that the consumption of steam in the heat-exchangers $U_1$ to $U_3$ for the heating of the return water to the constant temperature of the supply is directly proportional to the amount of heat consumed in the respective consumer units. The condensate is returned to the boiler through a common pipe-line $h_1$. If desired, there may be interposed in the pipe lines to the condensate meters K a steam trap S, or the like.

It should further be noted that the temperature regulator T allotted to each of the heat-exchangers $U_1$ to $U_3$ is provided with a thermo-sensitive element which is located in the stream of the flow leaving the top of the heat-exchanger, and by means of which this regulator acts upon a throttling device, for instance a damper, valve, or the like, which is interposed in the steam supply pipe $l$.

Practical tests have proved that highly developed regulators of this type are accurate to within ½% in both directions; and the limit of error is equally low in the case of the drum water meters used for the measurement of the condensate.

The arrangement shown in Fig. 2 differs from that shown in Fig. 1 only inasmuch as the heat-exchanger for each consumer unit is disposed on the same floor as the latter. The reference characters used apply to the same parts in both figures.

I claim:
1. A hot water heating system for a plurality of consumer units each consisting of one or more radiators, comprising in combination a hot water supply pipe system common to all the consumer units, a heat exchanger associated with each of the said consumer units and connected to the said supply pipe system, a separate return pipe from each consumer unit to the appropriate one of the said heat exchangers carrying water to be heated exclusively in the heat exchanger appropriate thereto, a condensate discharge pipe and a steam feed pipe connected to each of the said heat exchangers, and means interposed in each of the said condensate discharge pipes for the independent measurement of the entire heat consumption of each of the said consumer units.

2. A hot water heating system for a plurality of consumer units each consisting of one or more radiators, comprising in combination a hot water supply pipe system common to all the consumer units, a heat exchanger associated with each of the said consumer units and connected to the said supply pipe system, a separate and independent return pipe from each consumer unit to the appropriate one of the said heat exchangers carrying water to be heated exclusively in the exchanger appropriate thereto, a condensate discharge pipe and a steam feed pipe connected to each of the said heat exchangers, a thermo-regulator associated with each of the said heat exchangers and adapted to influence the flow of steam thereto for the purpose of maintaining constant water temperature at the commencement of the said supply pipe system, and means interposed in each of the said condensate discharge pipes for the independent measurement of the entire heat consumption of each of the said consumer units.

3. A hot water heating system for a plurality of consumer units each consisting of one or more radiators, comprising in combination a hot water supply pipe system common to all the consumer units, a heat exchanger associated with each of the said consumer units and connected to the said supply pipe system, a separate and independent return pipe from each consumer unit to the appropriate one of the said heat exchangers appropriate thereto, a condensate discharge pipe and a steam feed pipe connected to each of the said heat exchangers, a thermo-regulator associated with each of the said heat exchangers and adapted to influence the flow of steam thereto for the purpose of maintaining constant water temperature at the commencement of the said supply pipe system, and a water meter interposed in each of the said condensate discharge pipes for the independent measurement of the entire heat consumption of each of the said consumer units.

HEINRICH VIEWEGH.